R. VAUGHN.
CROSSCUT SAW HANDLE.
APPLICATION FILED JUNE 3, 1909.
949,948.
Patented Feb. 22, 1910.
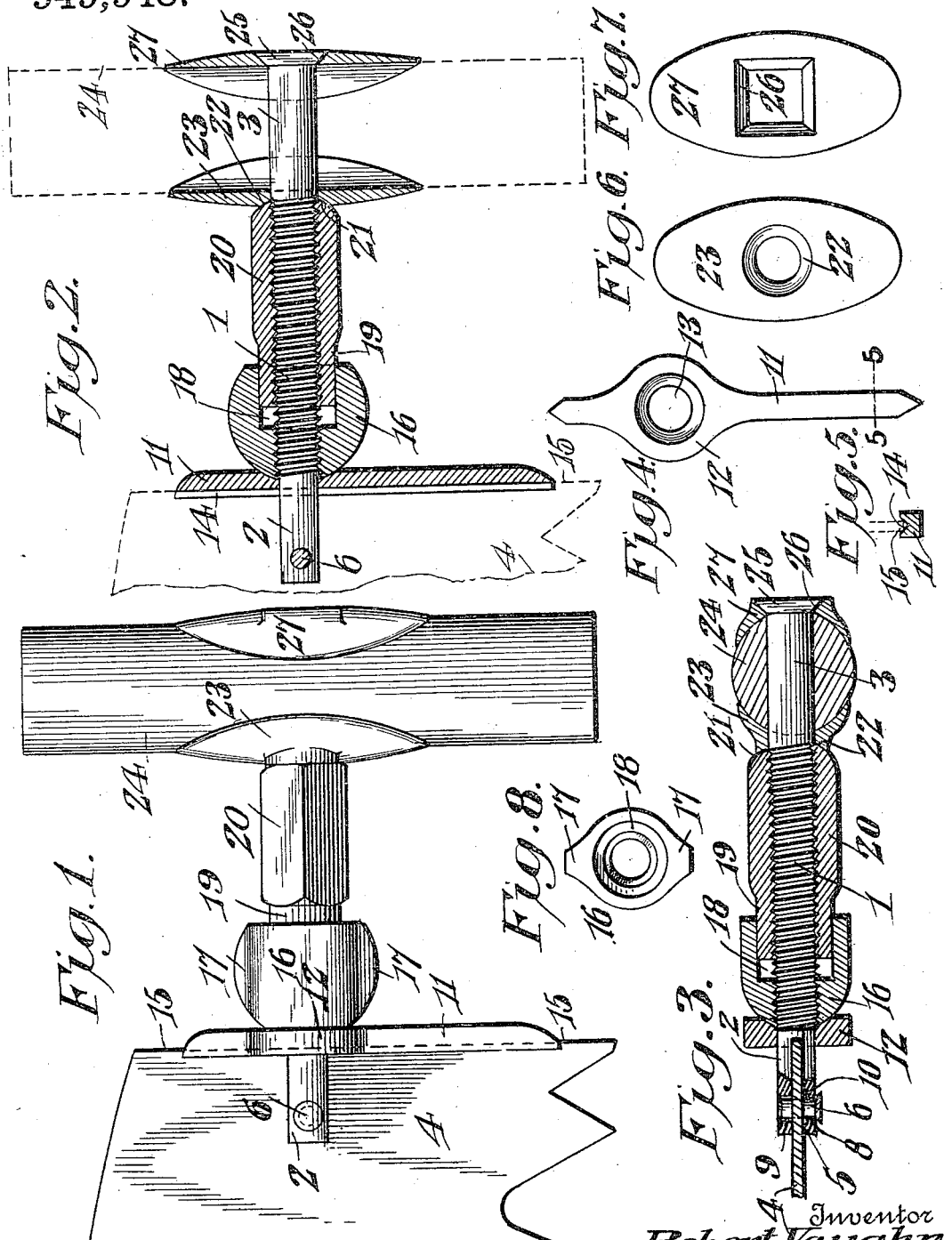

UNITED STATES PATENT OFFICE.

ROBERT VAUGHN, OF PHILOMATH, OREGON, ASSIGNOR, BY DIRECT AND MESNE ASSIGNMENTS, OF ONE-FOURTH TO SAMUEL S. EWING AND ONE-FOURTH TO ENOCH A. CONE, BOTH OF CORVALLIS, OREGON.

CROSSCUT-SAW HANDLE.

949,948.

Specification of Letters Patent.

Patented Feb. 22, 1910.

Application filed June 3, 1909. Serial No. 499,964.

*To all whom it may concern:*

Be it known that I, ROBERT VAUGHN, a citizen of the United States, residing at Philomath, in the county of Benton and State of Oregon, have invented a new and useful Crosscut-Saw Handle, of which the following is a specification.

The invention relates to a cross cut saw handle.

The object of the present invention is to improve the construction of the means for connecting a cross cut saw handle with the blade of the saw, and to provide a simple inexpensive and efficient device of great strength and durability, capable of securely connecting a handle to the blade of a cross cut saw, and of permitting an independent adjustment of either part without loosening or otherwise affecting the other part.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of an attachment, constructed in accordance with this invention and shown applied to the blade and handle of a cross cut saw. Fig. 2 is a vertical longitudinal sectional view of the same. Fig. 3 is a horizontal sectional view. Fig. 4 is an elevation of the blade-engaging member or guard. Fig. 5 is a sectional view of the same on the line 5—5 of Fig. 4. Figs. 6 and 7 are detail views of the handle plates or washers. Fig. 8 is a detail view of the inner blade adjusting nut.

Like numerals of reference designate corresponding parts in all the figures of the drawing.

The attachment, which is designed to be constructed of malleable metal, or other suitable material, comprises in its construction a horizontal screw 1, having an intermediate threaded portion and smooth inner and outer portions 2 and 3, the inner portion 2 being slotted to receive the adjacent end of a cross cut saw blade 4. The blade 4 is secured in the slot 5 by means of a pin 6, having a head at one end and provided at the other end with an enlargement 7. The screw is provided at opposite sides of the slot 5 with alined openings 8 and 9. The opening 9 is of a slightly greater diameter than the opening 8 to accommodate the enlargement 7 of the pin and to permit the pin to be partially withdrawn, the outward movement being limited by the shoulder formed by a recess 10 at the inner end of the opening 8. This permits the inner end of the pin to be withdrawn clear of the blade, when it is desired to disconnect the screw therefrom, and at the same time the pin is prevented from becoming disconnected from the screw.

The inner smooth portion of the screw receives a saw-engaging member or guard 11, arranged vertically and provided at its upper portion with an enlargement 12, having an opening 13 for the passage of the screw. The saw-engaging member or guard 11, which is narrow, as clearly illustrated in Fig. 4 of the drawing, is provided in its inner edge with a vertical longitudinal groove 14, preferably V-shaped or tapered in cross section and adapted to receive the end edge 15 of the blade 4. The V-shaped or tapered recess 14, forms oppositely angularly related walls, which operate to center the blade, whereby the latter is held perfectly true.

The opening 13, which is counter-sunk, is engaged by an inner tapered adjusting nut 16, engaging the inner end of the intermediate threaded portion of the screw and tapered or rounded to fit the counter-sunk opening 13 and provided with enlargements or wings 17 to enable it to be readily grasped and rotated. The adjusting nut 16 is counter-bored to form a smooth opening or recess 18 for the reception of a smooth portion 19 of a handle adjusting nut 20. The handle adjusting nut, which is provided with an outer polygonal portion, as clearly illustrated in Fig. 1 of the drawing, has a tapered outer end 21, which fits in a counter-sunk opening 22 of an inner handle-engaging plate or washer 23. The smooth outer portion 3 of the screw pierces a wooden saw handle 24 of the usual construction, and the outer end of the screw is provided with a square head 25, beveled adjacent to the smooth portion 3 and engaging a rectangular countersunk opening 26 of an outer handle-engaging plate or washer 27. The head or outer end of the screw is arranged flush with the outer handle-engaging plate or washer, and this construction enables the handle to be grasped and operated in line with the screw, when desired. The inner smooth portion of the outer handle-adjusting nut telescopes into the enlarged portion 18 of the opening of the inner blade-adjusting nut, but the arrangement may be reversed as either nut may telescope within the outer nut. The smooth portion of the handle-adjusting nut forms a support for the recessed portion of the inner nut and provides a solid structure of great strength and durability, and the overlapping of the nuts compactly arranges the adjusting means between the blade and the handle. The nuts are independently adjustable so that either the handle or the blade may be adjusted without loosening the part not adjusted, and when the parts are adjusted, they will not become loose through the jar and vibration incident to the operation of the saw.

Having thus fully described my invention, what I claim as new and desire to secure by Letters Patent, is:

1. An attachment of the class described including a continuous screw having an intermediate threaded portion and provided with an inner blade-receiving terminal and an outer handle-receiving portion, a blade-engaging member or guard mounted on the inner portion of the screw, an inner handle-engaging plate or washer arranged on the outer portion of the screw, and independently operable inner and outer nuts mounted on the intermediate threaded portion of the screw and engaging the guard or member and the plate or washer.

2. An attachment of the class described including a continuous screw having an intermediate threaded portion and provided with an inner blade-receiving terminal and an outer handle-receiving portion, a blade-engaging member or guard mounted on the inner portion of the screw, an inner handle-engaging plate or washer arranged on the outer portion of the screw, and inner and outer telescopic nuts mounted on the intermediate threaded portion of the screw and fitting one within the other and operable independently of each other to adjust the guard or member and the plate or washer.

3. An attachment of the class described including a screw having an intermediate threaded portion, and inner and outer terminal portions for the blade and the handle of a cross cut saw, a blade-engaging guard mounted on the inner portion of the screw and having a counter-sunk opening for the same, an inner handle plate also provided with a counter-sunk opening and mounted on the outer portion of the screw, and inner and outer independently operable adjusting nuts arranged on the intermediate threaded portion of the screw and having tapered ends fitting in the counter-sunk openings of the guard or member and the inner handle plate.

4. An attachment of the class described including a continuous screw having an intermediate threaded portion and provided with inner and outer threaded portions arranged to receive the blade and handle of a cross cut saw, members mounted on the screw at the ends of the threaded portion for engaging the handle and the blade, and independently operable adjusting nuts arranged on the intermediate threaded portion of the screw and engaging the said members, one of the nuts being relatively short and counter-bored to provide a smooth recess, and the other nut having a smooth portion operating in the recess.

5. An attachment of the class described including a screw having an intermediate threaded portion and provided at its outer portion with a head, inner and outer handle-engaging plates having openings receiving the screw, the outer plate being engaged by the head of the screw, a blade engaging member or guard mounted on the inner portion of the screw, and independently operable telescopic adjusting nuts mounted on the threaded portion of the screw and arranged between and engaging the guard or member and the inner handle plate.

6. An attachment of the class described including a continuous screw having an intermediate threaded portion and provided with smooth inner and outer portions, the inner portion being slotted and the outer portion being provided with a polygonal head, inner and outer handle blades arranged on the outer smooth portion of the screw and provided with openings for the same, the head of the screw being counter-sunk in the outer handle plate, a blade-engaging member or guard mounted on the inner portion of the screw, and independently operable adjusting nuts arranged on the intermediate threaded portion of the screw and engaging the guard or member and the inner handle plate.

In testimony, that I claim the foregoing as my own, I have hereto affixed my signature in the presence of two witnesses.

ROBERT VAUGHN.

Witnesses:
  J. F. YATES,
  PATTI DURRELL.